US012670545B2

(12) United States Patent
Xu et al.

(10) Patent No.: US 12,670,545 B2
(45) Date of Patent: Jun. 30, 2026

(54) CASCADED LOCAL IMPLICIT TRANSFORMER FOR ARBITRARY-SCALE SUPER-RESOLUTION

(71) Applicants: MEDIATEK INC., Hsinchu (TW); National Tsing Hua University, Hsinchu (TW)

(72) Inventors: Yu-Syuan Xu, Hsinchu City (TW); Hao-Wei Chen, Hsinchu City (TW); Chun-Yi Lee, Hsinchu (TW)

(73) Assignees: MEDIATEK INC., Hsinchu City (TW); National Tsing Hua University, Hsinchu (TW)

( * ) Notice: Subject to any disclaimer, the term of this patent is extended or adjusted under 35 U.S.C. 154(b) by 476 days.

(21) Appl. No.: 18/299,395

(22) Filed: Apr. 12, 2023

(65) Prior Publication Data

US 2024/0070809 A1     Feb. 29, 2024

Related U.S. Application Data

(60) Provisional application No. 63/373,558, filed on Aug. 26, 2022.

(51) Int. Cl.
$$G06T\ 3/4046 \quad (2024.01)$$
$$G06T\ 3/4053 \quad (2024.01)$$
$$G06T\ 7/73 \quad (2017.01)$$
(52) U.S. Cl.
CPC .......... *G06T 3/4046* (2013.01); *G06T 3/4053* (2013.01); *G06T 7/73* (2017.01); *G06T 2207/20081* (2013.01)

(58) Field of Classification Search
None
See application file for complete search history.

(56) References Cited

U.S. PATENT DOCUMENTS

2023/0377226 A1* 11/2023 Saharia ................. G06V 10/82

OTHER PUBLICATIONS

Hao-Wei Chen, Yu-Syuan Xu, Min-Fong Hong, Yi-Min Tsai, Hsien-Kai Kuo, Chun-Yi Lee, "Cascaded Local Implicit Transformer for Arbitrary-Scale Super-Resolution," arXiv:2303.16513v1 [cs.CV], Mar. 29, 2023, https://doi.org/10.48550/arXiv.2303.16513 (Year: 2023).*
Chen et al., "Learning Continuous Image Representation with Local Implicit Image Function, " 2021 IEEE/CVF Conference on Computer Vision and Pattern Recognition (CVPR), Nashville, TN, USA, 2021, pp. 8624-8634, doi: 10.1109/CVPR46437.2021.00852 (Year: 2021).*

(Continued)

*Primary Examiner* — Michelle M Koeth
(74) *Attorney, Agent, or Firm* — Winston Hsu

(57) ABSTRACT

A method can include receiving a low-resolution (LR) image, extracting a first feature embedding from the LR image, performing a first upsampling to the LR image by a first upsampling factor to generate a upsampled image, receiving a LR coordinate of a pixel within the LR image and a first cell size of the LR coordinate, generating a first residual image based on the first feature embedding, the LR coordinate, and the first cell size of the LR coordinate using a local implicit image function, and generating a first high-resolution (HR) image by combining the first residual image and the upsampled image via element-wise addition.

15 Claims, 16 Drawing Sheets

(56) References Cited

OTHER PUBLICATIONS

Yang et al., "Implicit Transformer Network for Screen Content Image Continuous Super-Resolution," 35th Conference on Neural Information Processing Systems (NeurIPS 2021), Dec. 6, 2021 (Year: 2021).*

Cao et al., "CiaoSR: Continuous Implicit Attention-in-Attention Network for Arbitrary-Scale Image Super-Resolution," arXiv: 2212.04362v1 [cs.CV], Dec. 8, 2022, https://doi.org/10.48550/arXiv.2212.04362 (Year: 2022).*

Wu et al., "Learning Dynamic Scale Awareness and Global Implicit Functions for Continuous-Scale Super-Resolution of Remote Sensing Images," in IEEE Transactions on Geoscience and Remote Sensing, vol. 61, pp. 1-15, Jan. 27, 2023, Art No. 5602315, doi: 10.1109/TGRS.2023.3240254 (Year: 2023).*

Lee et al., "Local Texture Estimator for Implicit Representation Function," 2022 IEEE/CVF Conference on Computer Vision and Pattern Recognition (CVPR), New Orleans, LA, USA, Jun. 24, 2022, pp. 1919-1928, doi: 10.1109/CVPR52688.2022.00197 (Year: 2022).*

Tancik et al., "Fourier Features Let Networks Learn High Frequency Functions in Low Dimensional Domains," 34th Conference on Neural Information Processing Systems (NeurIPS 2020), Vancouver, Canada (Year: 2020).*

Chen, Y., et al., "Learning Continuous Image Representation with Local Implicit Image Function", https://arxiv.org/pdf/2012.09161.pdf, 2021, pp. 1-11.

Lee, J., et al., "Local Texture Estimator for Implicit Representation Function", https://ieeexplore.ieee.org/stamp/stamp/jsp?tp=&arnumber=9880382, 2022, pp. 1-10.

Hao-Wei Chen et al., "Cascaded Local Implicit Transformer for Arbitrary-Scale Super-Resolution", arXiv, Mar. 29, 2023, pp. 1-11, Cornell University, USA. (https://doi.org/10.48550/arXiv.2303.16513), Mar. 29, 2023.

Yinbo Chen et al., "Learning Continuous Image Representation with Local Implicit Image Function", arXiv, Apr. 1, 2021, pp. 1-11, Cornell University, USA. (https://doi.org/10.48550/arXiv.2012.09161), Apr. 1, 2021.

Jiezhang Cao et al., "CiaoSR: Continuous Implicit Attention-in-Attention Network for Arbitrary-Scale Image Super-Resolution", arXiv, Jan. 12, 2023, pp. 1-16, Cornell University, USA. (https://doi.org/10.48550/arXiv.2212.04362), Jan. 12, 2023.

* cited by examiner

| METHOD | x2 | x3 | x4 | x6 | x12 | x18 | x24 | x30 |
|---|---|---|---|---|---|---|---|---|
| BICUBIC | 31.01 | 28.22 | 26.66 | 24.82 | 22.27 | 21.00 | 20.19 | 19.59 |
| EDSR-BASELINE | 34.55 | 30.90 | 28.94 | - | - | - | - | - |
| EDSR-BASELINE-META-SR | 34.64 | 30.93 | 28.92 | 26.61 | 23.55 | 22.03 | 21.06 | 20.37 |
| EDSR-BASELINE-LIIF | 34.67 | 30.96 | 29.00 | 26.75 | 23.71 | 22.17 | 21.18 | 20.48 |
| EDSR-BASELINE-ULTRASR | 34.69 | 31.02 | 29.05 | 26.81 | 23.75 | 22.21 | 21.21 | 20.51 |
| EDSR-BASELINE-IPE | 34.72 | 31.01 | 29.04 | 26.79 | 23.75 | 22.21 | 21.22 | 20.51 |
| EDSR-BASELINE-LTE | 34.72 | 31.02 | 29.04 | 26.81 | 23.78 | 22.23 | 21.24 | 20.53 |
| EDSR-BASELINE-CLIT | 34.81 | 31.12 | 29.15 | 26.92 | 23.83 | 22.29 | 21.26 | 20.53 |
| RDN-META-SR | 35.00 | 31.27 | 29.25 | 26.88 | 23.73 | 22.18 | 21.17 | 20.47 |
| RDN-LIIF | 34.99 | 31.26 | 29.27 | 26.99 | 23.89 | 22.34 | 21.31 | 20.59 |
| RDN-ULTRASR | 35.00 | 31.30 | 29.32 | 27.03 | 23.73 | 22.36 | 21.33 | 20.61 |
| RDN-IPE | 35.04 | 31.32 | 29.32 | 27.04 | 23.93 | 22.38 | 21.34 | 20.63 |
| RDN-LTE | 35.04 | 31.32 | 29.33 | 27.04 | 23.95 | 22.40 | 21.36 | 20.64 |
| RDN-CLIT | 35.10 | 31.39 | 29.39 | 27.12 | 24.01 | 22.45 | 21.38 | 20.64 |
| SwinIR-METASR | 35.15 | 31.40 | 29.33 | 26.94 | 23.80 | 22.26 | 21.26 | 20.54 |
| SwinIR-LIIF | 35.17 | 31.46 | 29.46 | 27.15 | 24.02 | 22.43 | 21.40 | 20.67 |
| SwinIR-LTE | 35.24 | 31.50 | 29.51 | 27.20 | 24.09 | 22.50 | 21.47 | 20.73 |
| SwinIR-CLIT | 35.29 | 31.55 | 29.55 | 27.26 | 24.11 | 22.51 | 21.45 | 20.70 |

FIG. 9

| METHOD | SET5 | | | | | SET14 | | | | |
| --- | --- | --- | --- | --- | --- | --- | --- | --- | --- | --- |
| | x2 | x3 | x4 | x6 | x8 | x2 | x3 | x4 | x6 | x8 |
| RDN | 38.24 | 34.71 | 32.47 | - | - | 34.01 | 30.57 | 28.81 | - | - |
| RDN-META-SR | 38.22 | 34.63 | 32.38 | 29.04 | 26.96 | 33.98 | 30.54 | 28.78 | 26.51 | 24.97 |
| RDN-LIIF | 38.17 | 34.68 | 32.50 | 29.15 | 27.14 | 33.97 | 30.53 | 28.80 | 26.64 | 25.15 |
| RDN-ULTRASR | 38.21 | 34.67 | 32.49 | 29.33 | 27.24 | 33.97 | 30.59 | 28.86 | 26.69 | 25.25 |
| RDN-IPE | 38.11 | 34.68 | 32.51 | 29.25 | 27.22 | 33.94 | 30.47 | 28.75 | 26.58 | 25.09 |
| RDN-LTE | 38.23 | 34.72 | 32.61 | 29.32 | 27.26 | 34.09 | 30.58 | 28.88 | 26.71 | 25.16 |
| RDN-CLIT | 38.26 | 34.79 | 32.69 | 29.54 | 27.34 | 34.09 | 30.69 | 28.93 | 26.83 | 25.36 |
| SwinIR | 38.35 | 34.89 | 32.72 | - | - | 34.14 | 30.77 | 28.94 | - | - |
| SwinIR-METASR | 38.26 | 34.77 | 32.47 | 29.09 | 27.02 | 34.14 | 30.66 | 28.85 | 26.58 | 25.09 |
| SwinIR-LIIF | 38.28 | 34.87 | 32.73 | 29.46 | 27.36 | 34.14 | 30.75 | 28.98 | 26.82 | 25.34 |
| SwinIR-LTE | 38.33 | 34.89 | 32.81 | 29.50 | 27.35 | 34.25 | 30.80 | 29.06 | 26.86 | 25.42 |
| SwinIR-CLIT | 38.41 | 34.97 | 32.86 | 29.69 | 27.62 | 34.27 | 30.85 | 29.08 | 26.94 | 25.55 |

*FIG. 10*

| B100 | | | | | URBAN100 | | | | |
| x2 | x3 | x4 | x6 | x8 | x2 | x3 | x4 | x6 | x8 |
| --- | --- | --- | --- | --- | --- | --- | --- | --- | --- |
| 32.34 | 29.26 | 27.72 | - | - | 32.89 | 28.80 | 26.61 | - | - |
| 32.33 | 29.26 | 27.71 | 25.90 | 24.83 | 32.92 | 28.82 | 26.55 | 23.99 | 22.59 |
| 32.32 | 29.26 | 27.74 | 25.98 | 24.91 | 32.87 | 28.82 | 26.68 | 24.20 | 22.79 |
| 32.35 | 29.29 | 27.77 | 26.01 | 24.96 | 32.97 | 28.92 | 26.78 | 24.30 | 22.87 |
| 32.31 | 29.28 | 27.76 | 26.00 | 24.93 | 32.97 | 28.82 | 26.76 | 24.26 | 22.87 |
| 32.36 | 29.30 | 27.77 | 26.01 | 24.95 | 33.04 | 28.97 | 26.81 | 24.28 | 22.88 |
| 32.39 | 29.33 | 27.80 | 26.07 | 25.00 | 33.14 | 29.05 | 26.93 | 24.44 | 23.04 |
| 32.44 | 29.37 | 27.83 | - | - | 33.40 | 29.29 | 27.07 | - | - |
| 32.39 | 29.31 | 27.75 | 25.94 | 24.86 | 33.29 | 29.12 | 26.76 | 24.16 | 22.75 |
| 32.39 | 29.34 | 27.84 | 26.07 | 25.01 | 33.36 | 29.33 | 27.15 | 24.59 | 23.14 |
| 32.44 | 29.39 | 27.86 | 26.09 | 25.03 | 33.50 | 29.41 | 27.24 | 24.62 | 23.17 |
| 32.46 | 29.42 | 27.91 | 26.15 | 25.09 | 33.56 | 29.43 | 27.25 | 24.77 | 23.33 |

| | IN-DISTRIBUTION | | | OUT-OF-DISTRIBUTION | | |
|---|---|---|---|---|---|---|
| | x2 | x3 | x4 | x6 | x8 | x12 |
| LIT | 34.79 | 31.07 | 29.10 | 26.84 | 25.47 | 23.77 |
| LIT (-a) | 34.71 | 31.00 | 29.02 | 26.76 | 25.40 | 23.70 |
| LIT (-f) | 34.78 | 31.07 | 29.09 | 26.83 | 25.46 | 23.77 |
| LIT (-c) | 34.65 | 31.00 | 29.04 | 26.80 | 25.45 | 23.77 |
| LIT (+e) | 34.79 | 31.08 | 29.11 | 26.85 | 25.48 | 23.78 |

FIG. 14

| LOCAL GIRD $G_h \times G_w$ | IN-DISTRIBUTION | | | OUT-OF-DISTRIBUTION | | | Training time |
|---|---|---|---|---|---|---|---|
| | x2 | x3 | x4 | x6 | x8 | x12 | |
| 1 x 1 | 34.71 | 31.00 | 29.02 | 26.76 | 25.40 | 23.70 | 20.9 |
| 3 x 3 | 34.76 | 31.04 | 29.07 | 26.81 | 25.46 | 23.76 | 23.2 |
| 5 x 5 | 34.78 | 31.07 | 29.08 | 26.83 | 25.47 | 23.78 | 28.4 |
| 7 x 7 | 34.79 | 31.07 | 29.10 | 26.84 | 25.47 | 23.77 | 33.6 |
| 9 x 9 | 34.79 | 31.06 | 29.10 | 26.84 | 25.47 | 23.77 | 53.0 |
| 15×15 | 34.83 | 31.10 | 29.11 | 26.86 | 25.49 | 23.78 | 76.1 |
| 25×25 | 34.86 | 31.13 | 29.15 | 26.88 | 25.50 | 23.80 | 190.9 |

FIG. 15

| TRAINING STRATEGY | x2 | x3 | x4 | x6 | x8 | x12 |
|---|---|---|---|---|---|---|
| TRAINING WITH $s \sim U(1, 4)$ | 34.79 | 31.07 | 29.10 | 26.84 | 25.45 | 23.77 |
| TRAINING WITH $s \sim U(1, 12)$ | 34.69 | 31.06 | 29.11 | 26.87 | 25.52 | 23.82 |
| ALTERNATIVE TRAINING STRATEGY | 34.75 | 31.09 | 29.12 | 26.88 | 25.52 | 23.81 |
| CUMULATIVE TRAINING STRATEGY | 34.78 | 31.10 | 29.14 | 26.89 | 25.54 | 23.83 |

FIG. 16

CASCADED LOCAL IMPLICIT TRANSFORMER FOR ARBITRARY-SCALE SUPER-RESOLUTION

INCORPORATION BY REFERENCE

This present application claims the benefit of U.S. Provisional Application No. 63/373,558, "Cascaded Local Implicit Transformer for Arbitrary-Scale Super-Resolution" filed on Aug. 26, 2022, which is incorporated herein by reference in its entirety.

TECHNICAL FIELD

The present disclosure relates to image processing techniques, and, more particularly, to image super-resolution using deep neural networks (DNNs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Deep Neural Networks (DNNS) have achieved remarkable results on single image super-resolution (SISR). SISR is used to reconstruct high-resolution (HR) images from their corresponding low-resolution (LR) counterparts. The input is a blurred image or an LR image and the output is a high-definition image.

SUMMARY

Aspects of the disclosure provide a first method. The first method can include receiving a low-resolution (LR) image, extracting a first feature embedding from the LR image, performing a first upsampling to the LR image by a first upsampling factor to generate a upsampled image, receiving a LR coordinate of a pixel within the LR image and a first cell size of the LR coordinate, generating a first residual image based on the first feature embedding, the LR coordinate, and the first cell size of the LR coordinate using a local implicit image function, and generating a first high-resolution (HR) image by combining the first residual image and the upsampled image.

In an embodiment, the first residual image is generated by applying convolution functions to the first feature embedding to extract a local query latent embedding, a local key latent embedding and a local value latent embedding at the LR coordinate, performing upsampling operations to the local query latent embedding, the local key latent embedding, and the local value latent embedding, and generating a local latent embedding.

In an embodiment, the local latent embedding is generated by generating an attention matrix by adding an inner product of the local query latent embedding and the local key latent embedding with a relative positional bias of the LR coordinate, generating a local attention map by normalizing the attention matrix, and generating the local latent embedding by performing element-wise multiplication of the local value latent embedding and the local attention map.

In an embodiment, the first residual image is generated by applying convolution functions to the first feature embedding to extract a local frequency latent embedding at the LR coordinate, performing upsampling operations to the local frequency latent embedding, and generating a local frequency embedding.

In an embodiment, the local frequency embedding is generated by generating a relative positional encoding of the LR coordinate, and generating the local frequency embedding by multiplying a Fourier transform of the local frequency latent embedding with relative positional encoding of the LR coordinate.

In an embodiment, the method further includes training the local implicit image function with a first set of upsampling factors, and training the local implicit image function by alternatively switching between the first set of upsampling factors and a second set of upsampling factors, wherein upsampling factors in the first set of upsampling factors are smaller than upsampling factors in the second set of upsampling factors.

In an embodiment, the method further includes performing a second upsampling to the first feature embedding by a second upsampling factor to generate a second feature embedding, generating a second residual image based on the second feature embedding, the LR coordinate, and a second cell size of the LR coordinate using the local implicit image function, generating a combined residual image by combining the first residual image and the second residual image, and generating a second HR image by combining the combined residual image and the upsampled image.

Aspects of the disclosure provide an apparatus comprising circuitry. The circuity is configured to receive a low-resolution (LR) image, extract a first feature embedding from the LR image, perform a first upsampling to the LR image by a first upsampling factor to generate a upsampled image, receive a LR coordinate of a pixel within the LR image and a first cell size of the LR coordinate, generate a first residual image based on the first feature embedding, the LR coordinate, and the first cell size of the LR coordinate by using a local implicit image function, and generate a first high-resolution (HR) image by combining the first residual image and the upsampled image.

Aspects of the disclosure provide a non-transitory computer-readable medium storing instructions that, when executed by a processor, cause the processor to perform the method.

BRIEF DESCRIPTION OF THE DRAWINGS

Various embodiments of this disclosure that are proposed as examples will be described in detail with reference to the following figures, wherein like numerals reference like elements, and wherein:

FIG. 9 shows a performance comparison table between the CLIT according to embodiments of the present disclosure and other models for the DIV2K validation set.

FIG. 10 shows a performance comparison table between the CLIT according to embodiments of the present disclosure and other models for various validation sets.

FIG. 12 shows results of text images and comparison between the CLIT according to the embodiments of the present disclosure and results from the LIIF and the LTE.

FIG. 14 shows a table summarizing the quantitative contributions of each LIT component.

FIG. 15 shows a comparison table on the performance by the varying local grid sizes of local coordinate sampling.

FIG. 16 shows a quantitative comparison between the proposed cumulative training strategy and existing training strategy.

DETAILED DESCRIPTION OF EMBODIMENTS

Single Image Super-Resolution (SISR) is the process of reconstructing high-resolution (HR) images from their corresponding low-resolution (LR) counterparts. SISR has long been recognized as a challenging task in the low-level vision domain due to its ill-posed nature and has attracted a number of researchers dedicated to this field of study in the past decade. A line of SISR research referred to as fixed-scale SR focuses on extracting feature embeddings from LR images, and leveraging these embeddings to upsampled images with a predefined factor by learnable deconvolutions or sub-pixel convolutions. Despite the success, many of the proposed approaches necessitate a distinct deep neural network model for each upsampling scale, which is usually restricted to a limited selection of integers (e.g., 2, 3, 4). Such a limitation constrains the potential applications and deployment options of SISR models. To overcome it, approaches for upsampling LR images in a continuous manner via a single model emerge and have attracted considerable attention recently.

In the past few years, arbitrary-scale SR has emerged and attracted considerable attention from researchers. Recent endeavors achieved arbitrary-scale SR by replacing the upsampling layers commonly adopted by previous approaches with local implicit image functions and demonstrated favorable performance. Such local implicit functions utilize multi-layer perceptrons (MLPs) to map 2D coordinates and the corresponding latent representations to RGB values.

Figure 1A:
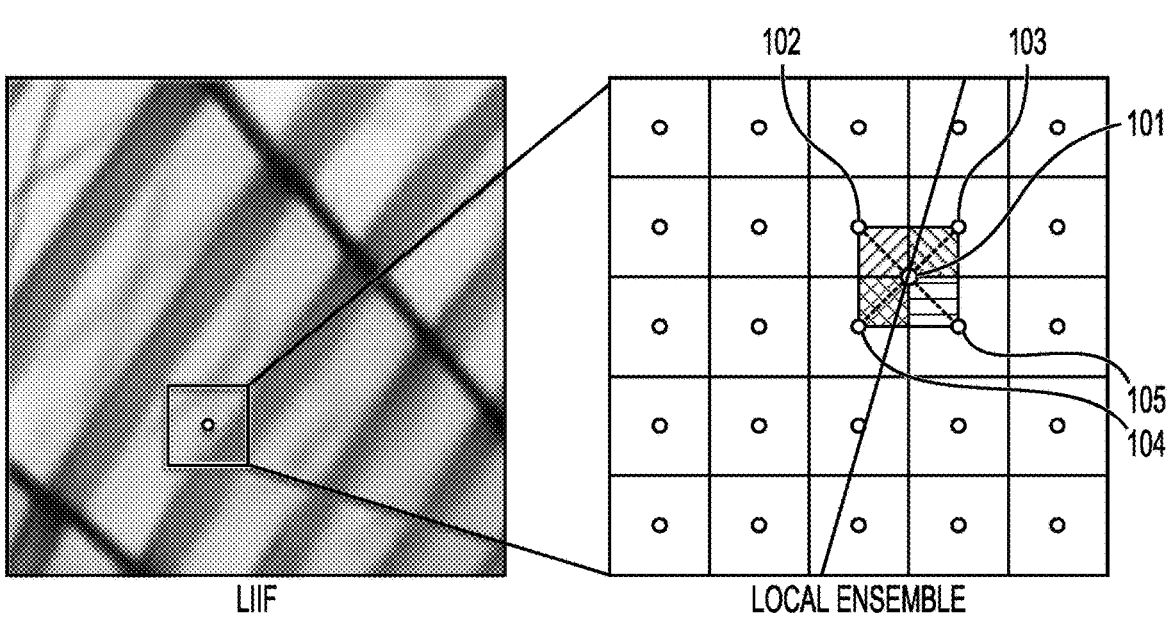
FIG. 1A-1B demonstrates the local ensemble technique adopted by contemporary mainstream approaches.
Figure 1B:
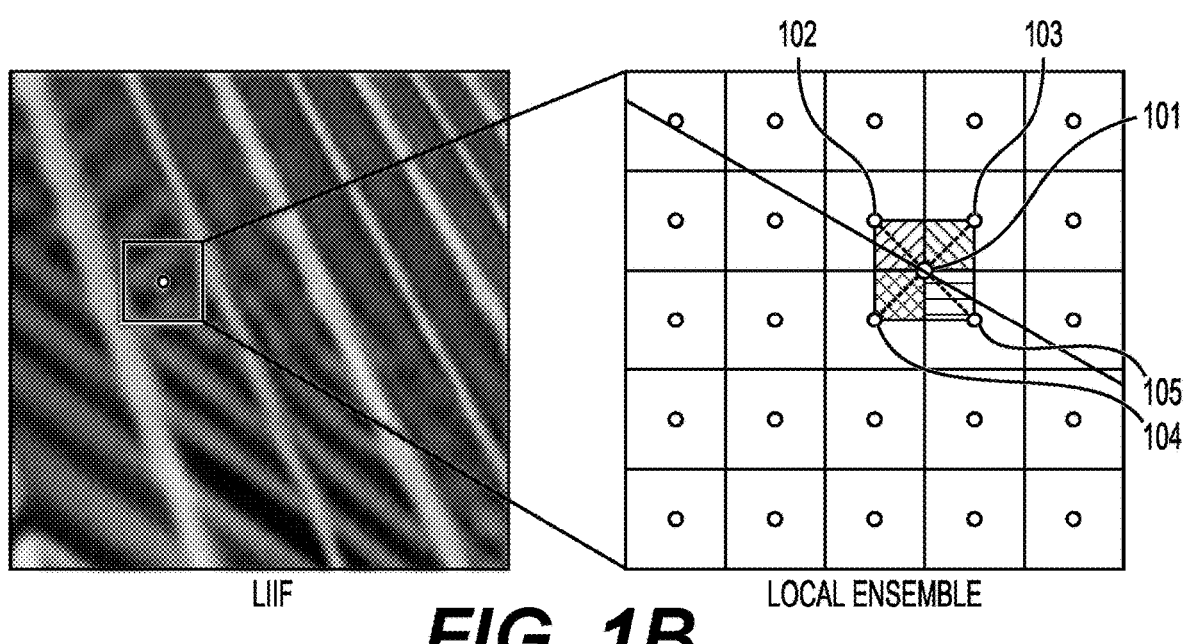

FIG. 1A-1B demonstrates the local ensemble technique adopted by contemporary mainstream approaches. It calculates the RGB value of the queried coordinate 101 by taking the weighted average of those of the surrounding four pixels 102, 103, 104, 105 based on their relative distances to the queried coordinate 101. In this manner, the predicted value does not consider the contextual information and is only based on the distance. The queried coordinate 101 is on the edge of the shaded area but the weighted-summed pixels are unable to provide such information. Therefore, despite the importance of pixel distance in SR tasks, contextual information should be paid more attention to.

In light of the above observations, the present disclosure proposes a local implicit transformer (LIT), which expands the number of referenced latent vectors and considers the feature correlation in the context by exploiting the attention mechanism. The LIT includes a cross-scale local attention block (CSLAB), a local frequency encoding block (LFEB), and a decoder. The CSLAB generates attention maps based on the bilinearly interpolated latent vector at queried coordinates and key latent vectors sampled from a grid of coordinates with a relative positional bias.

Figure 1C:
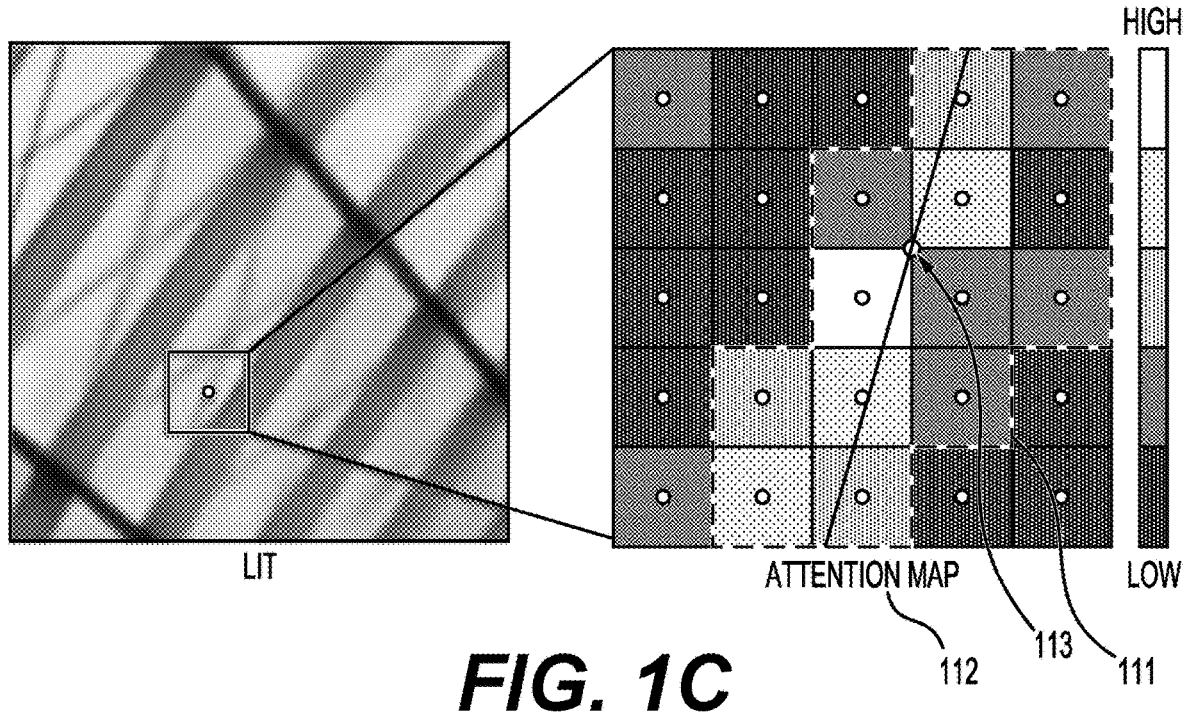
FIG. 1C-1D demonstrates the LIT approach disclosed in the present disclosure.
Figure 1D:
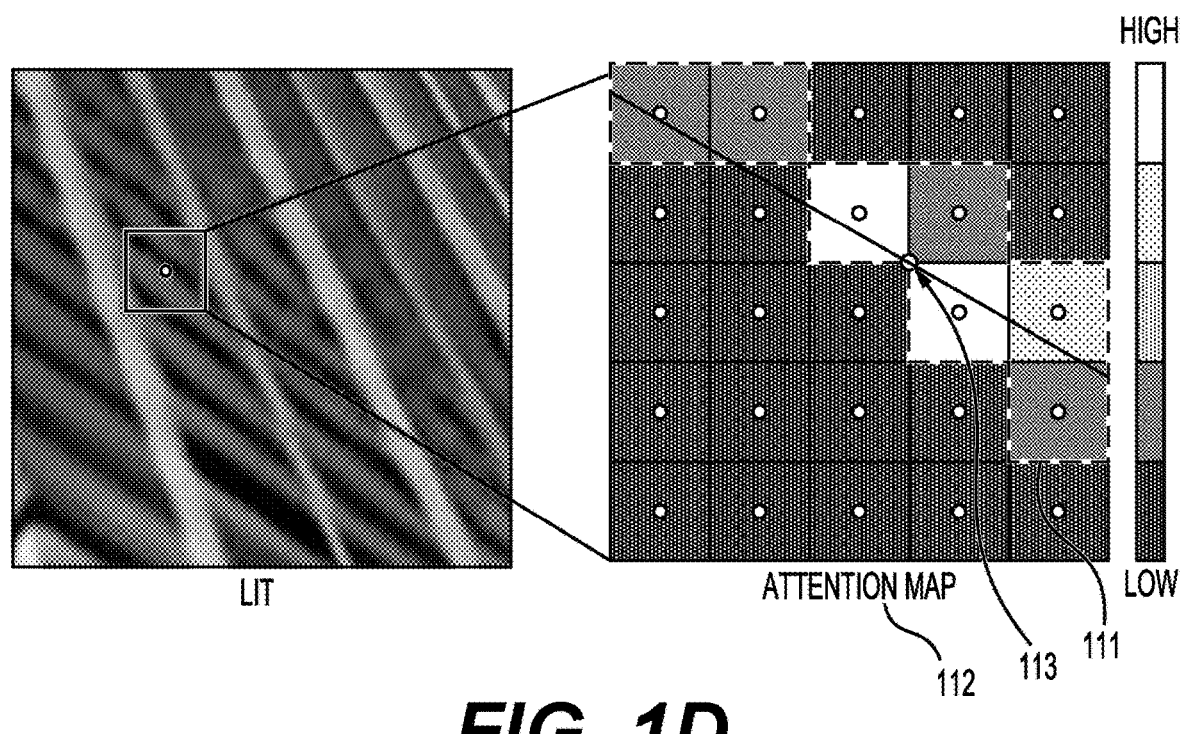

FIG. 1C-1D demonstrates the LIT approach disclosed in the present disclosure. It can be observed that the attention area 111 is highly aligned with the edge of the shaded area in the LR image in the attention map 112 generated by the LIT. With the attention map 112 applied to the feature embedding of the LR image, the RGB value of queried coordinate 113 can be predicted contextually. The LFEB can project the relative coordinates into latent space to resolve spectral bias problem of an implicit neural function. More specifically, the relative coordinates can be encoded into the relative positional encoding and multiplied with the frequency encoding extracted from the feature embedding in the Fourier domain to generate a frequency embedding. Hence, the frequency embedding combines the relative positional encoding with texture information to enhance the expressivity of relative coordinates. Finally, a decoder can be adopted to produce RGB values by taking advantage of the attention feature embedding and the frequency embedding.

In a local implicit image function, upsampling factors are crucial information for constructing HR images. However, training a local implicit image function with diverse upsampling factors (e.g., $1\times{\sim}30\times{+}$) at once is challenging. Therefore, the present disclosure discloses a cumulative training strategy to gradually improve its representative power. The strategy initially trains a local implicit image function with small upsampling factors (e.g., $1\times{\sim}4\times$) (a first set of upsampling factors) and then finetunes with alternatively sampled small upsampling factors (e.g., $1\times{\sim}4\times$) and large upsampling factors (e.g., $5\times{\sim}30\times{+}$) (a second set of upsampling factors). In addition, the present disclosure discloses a Cascaded LIT (CLIT) to exploit multi-scale feature embedding for complementing the missing details and information in one-step upsampling. The combination of cumulative training strategy and CLIT is able to solve arbitrary-scale SR tasks more efficiently.

Implicit neural representation is a technique for representing continuous-domain signals via coordinate-based multi-layer perceptrons (MLPs). Its concept has been adopted in various 3D tasks, e.g., 3D object shape modeling, 3D scene reconstruction, and 3D structure rendering. For example, neural radiance field (NeRF) employs implicit neural representation to perform novel view synthesis, which maps coordinates to RGB colors for a specific scene. Recently 2D applications of implicit neural representation have been attempted as well, such as image representation and super-resolution. The present disclosure is related to a technique called local implicit neural representation, which encodes LR images to feature embeddings such that similar information could be shared within local regions. Such local implicit neural representations are exploited to upscale LR images to HR images.

In the past several years, various deep neural network (DNN) based architectures have been proposed for SISR. Among these works, super resolution convolutional neural network (SR-CNN) pioneered the use of convolutional neural networks (CNNs) to achieve SISR in an end-to-end manner. It is later followed by several subsequent works that incorporated more complicated model architectures, such as residual blocks, dense connections, attention-based mechanisms, or cascaded frameworks, to extract more effective feature representations for SISR. Recently, transformer-based methods were introduced to SISR and achieved promising performance.

Most of the contemporary SISR works limit the up sampling scales to specific integer values and are required to train a distinct model for each upsampling scale. To overcome such a limitation, several approaches were proposed to train a unified model for arbitrary upsampling scales. Meta-SR proposed a meta-upscale module for predicting the weights of their convolutional filters from coordinates and scales. The predicted weights are then utilized to perform convolutions to generate HR images. In contrast to Meta-SR, local implicit image function (LIIF) employs an MLP as a local implicit function, which takes a queried coordinate in an HR image, its nearby feature representations extracted from the corresponding LR image, as well as a cell size of the LR coordinate to predict an RGB value for that coordinate. UltraSR and integrated positional encoding (IPE) extended LIIF by replacing coordinates with the embedded ones to deal with the spectral bias issue inherent in MLPs. Local texture estimator (LTE) further introduced an estimator that transforms coordinates into Fourier domain information to enrich the representational capability of its local implicit function. Different from the above approaches, the present disclosure methodology exploits a novel local attention mechanism and a cascaded framework to deal with the arbitrary-scale SR.

Figure 2:
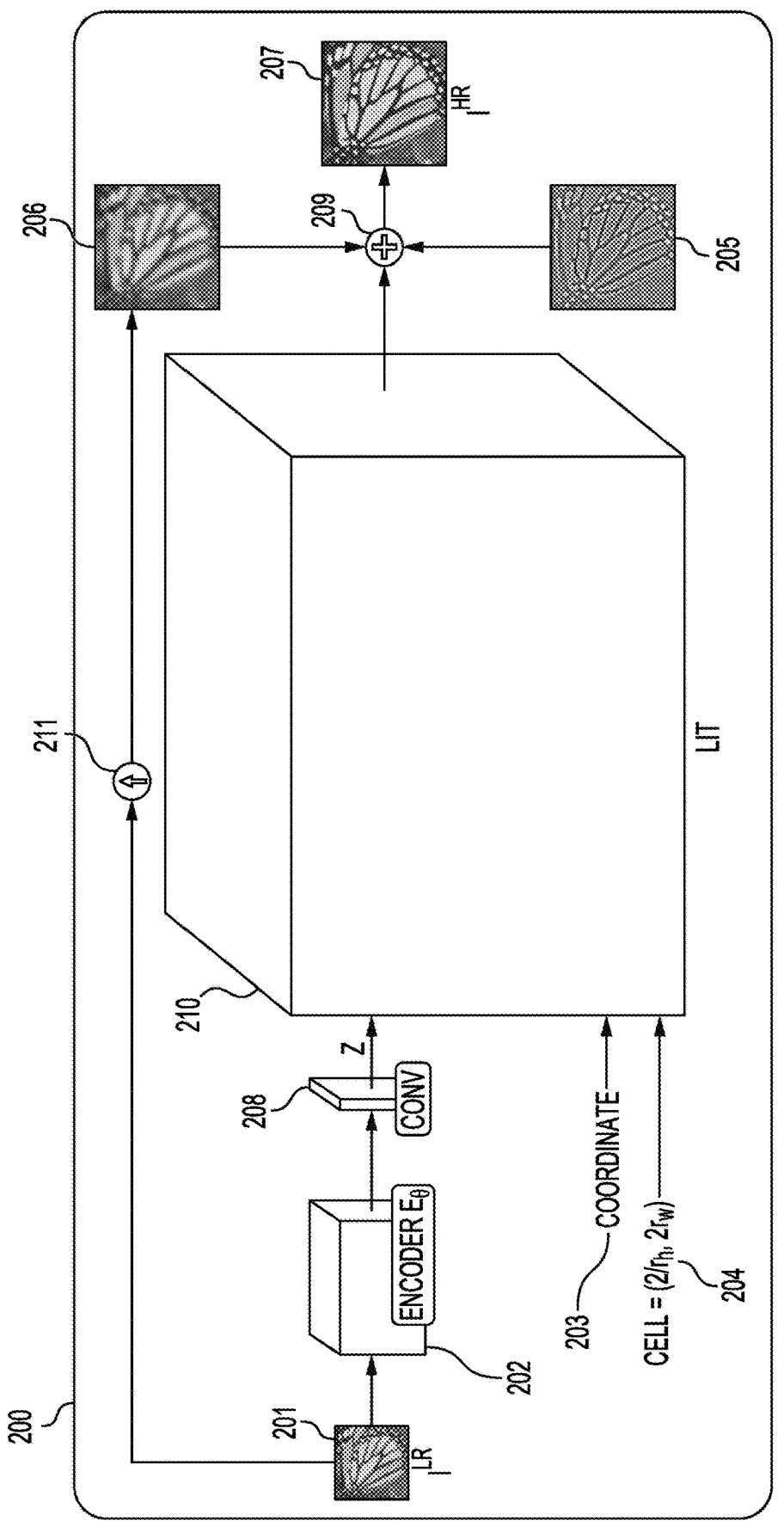
FIG. 2 shows an overview of a LIT framework 200 according to embodiments of the disclosure.

The proposed LIT is a framework that employs a novel cross-scaled local attention mechanism and a local frequency encoding technique to perform arbitrary-scale SR tasks. FIG. 2 shows an overview of a LIT framework 200 according to embodiments of the disclosure. The LIT framework 200 can be aimed to produce a high-resolution (HR) 207, denoted as $I^{HR} \in \mathbb{R}^{r_h H \times r_w W \times 3}$, at 2D HR coordinates $x^{HR} \in \mathcal{X}$ from a given low-resolution (LR) image 201, denoted as $I^{LR} \in \mathbb{R}^{H \times W \times 3}$, at 2D LR coordinates $x^{LR} \in \mathcal{X}$ based on an arbitrary upsampling scale $r=\{r_h, r_w\}$, where $\mathcal{X}$ is the 2D coordinate space that is used to represent an image in the continuous domain, $r_h$ is the upsampling scale affected on the height of the LR coordinate, and $r_w$ is the upsampling scale affected on the width of the LR coordinate. An encoder 202 can first extract a feature embedding, denoted by $Z \in \mathbb{R}^{H \times W \times C}$, from the LR image $I^{LR}$ 201. The extracted feature embedding $Z$, after going through a convolutional layer 208, can then be forwarded into a LIT 210 along with a queried coordinates 203 of LR image $I^{LR}$ 201 and a cell 204 of the queried coordinate 203 to generate the RGB values of a residual image 205, denoted by $$I_r^{HR} \in \mathbb{R}^{r_h H \times r_w W \times 3},$$

in a pixel-wise fashion. A bilinearly upsampled image 206 can be produced by sending the LR image 201 through a bilinear upsampling operation (e.g., a bilinear upsampling operator) 211. Lastly, the residual image 205 can be combined with the bilinearly upsampled image 206 via element-wise addition to derive a HR image 207.

Figure 3:
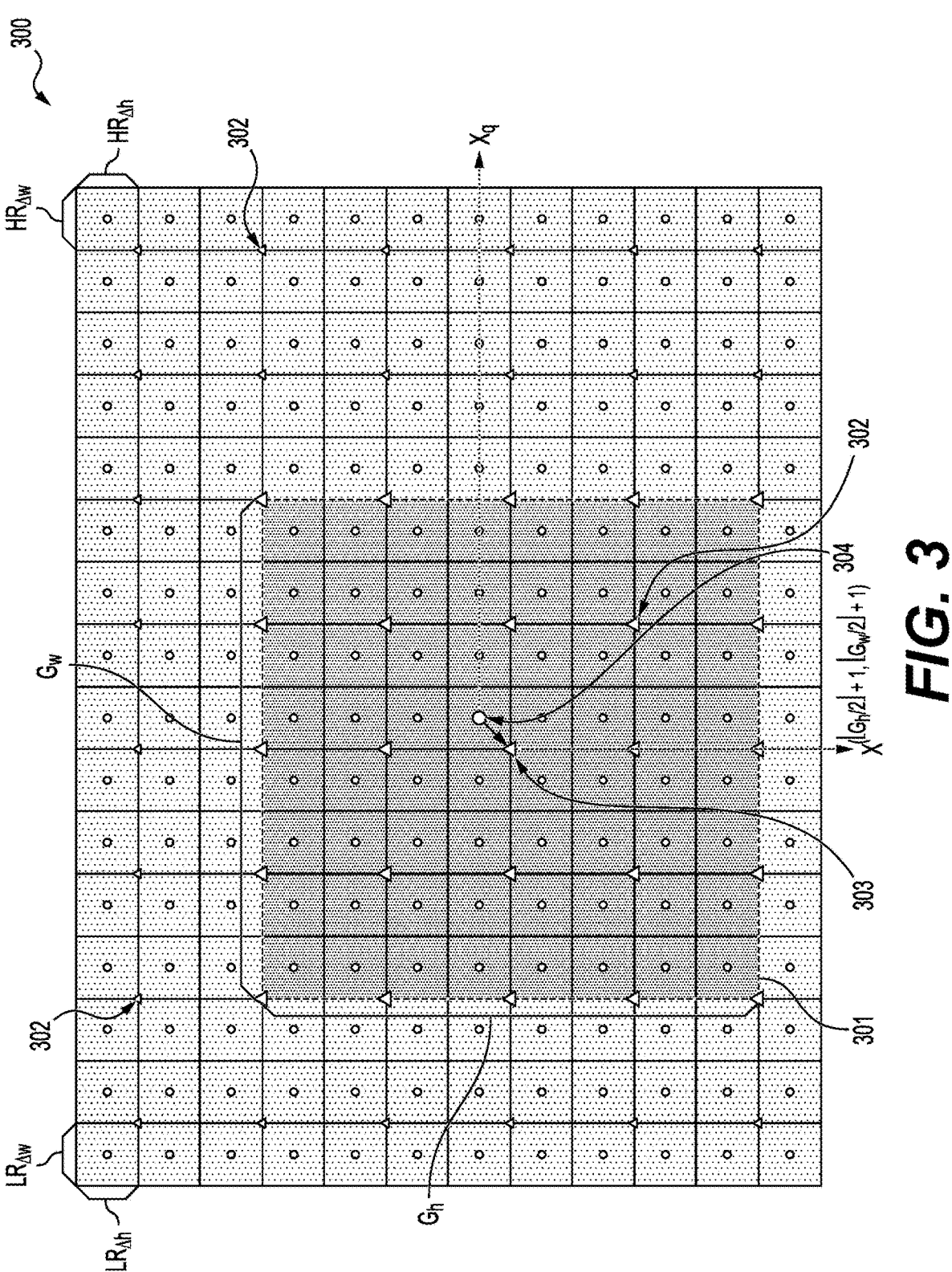
FIG. 3 shows a local coordinate sampling 300 according to embodiments of the disclosure.

FIG. 3 shows a local coordinate sampling 300 according to embodiments of the disclosure. A local grid 301 used for performing local coordinate sampling can have a size of $G_h \times G_w$, where $G_h$ is the height of the local grid 301 and $G_w$ is the width of the local grid 301. LR coordinates 302 within the local grid 301 are denoted as $x^{(i,j)}$ with (i, j) being the index of the local grid 301. The local grid 301 can be sampled such that the center LR coordinate 303 is the nearest LR coordinate to a queried HR coordinate 304. For example, a local grid 301 can be sampled to have a size of 4×4, and its center LR coordinate 303 can be represented as $x^{(\lfloor G_h/2 \rfloor + 1, \lfloor G_w/2 \rfloor + 1)} = x^{(3,3)}$. In additional, every LR coordinate 302 can have a size of $LR_{\Delta h} \times LR_{\Delta w}$, where $LR_{\Delta h}$ is the height of the LR coordinate and $LR_{\Delta w}$ is the width of the LR coordinate. Every HR coordinate 304 can have a size of $HR_{\Delta h} \times HR_{\Delta w}$, where $HR_{\Delta h}$ is the height of the HR coordinate and $HR_{\Delta w}$ is the width of the HR coordinate.

Figure 4:
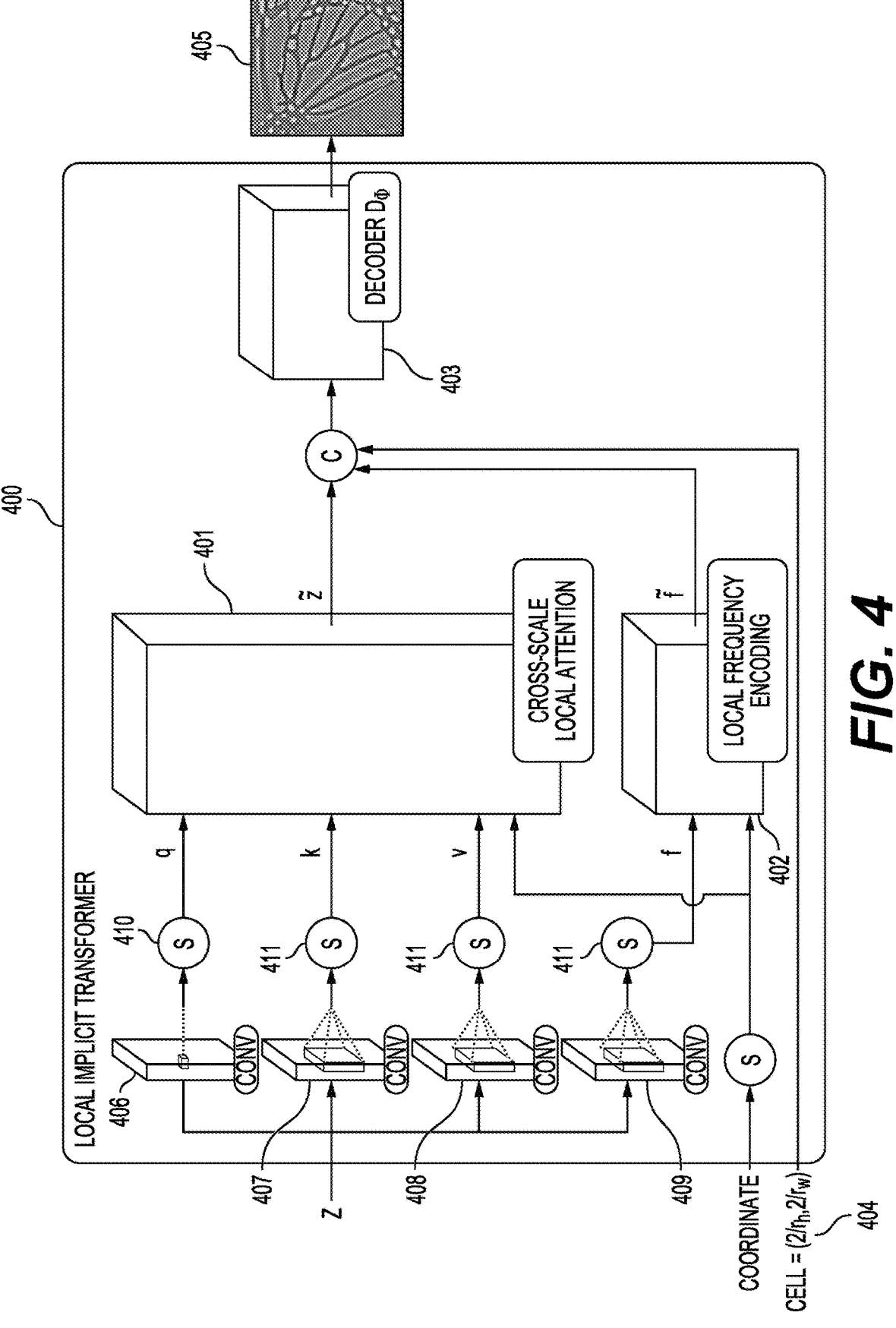
FIG. 4 shows a local implicit transformer (LIT) 400 diagram according to embodiments of the disclosure.

FIG. 4 shows a local implicit transformer (LIT) 400 diagram according to embodiments of the disclosure. The LIT 400 can be used for mapping any 2D coordinate in the continuous image domain to an RGB color. The LIT 400 can include a cross-scale local attention block (CSLAB) 401, a local frequency encoding block (LFEB) 402, and a decoder 403. The CSLAB 401 can be responsible for estimating a local latent embedding, denoted as $\tilde{z} \in \mathbb{R}^{G_h G_w \times C}$, where $G_h$ is the height of the local grid 301 and $G_w$ is the width of the local grid 301 as shown in FIG. 3. The LFEB 402 can be responsible for estimating a local frequency embedding, denoted as $\tilde{f}$. The decoder 403 can utilize the local latent embedding $\tilde{z}$ and the local frequency embedding $\tilde{f}$ along with a cell size 404 to generate a residual image 405. For example, the LIT 400 can first project an extracted feature embedding $Z$ by separating it into four convolutional layers 406-409 and then performing upsampling operations to produce four latent embeddings, corresponding to query q, key k, value v, and frequency f. The query latent embedding q can go through a bilinear upsampling operation 410 while the key latent embedding k, the value latent embedding v, and the frequency latent embedding f can go through local sampling operation 411. Based on a queried HR coordinate $x_q \in x^{LR}$, the CSLAB 401 and the LFEB 402 estimate the local latent embedding $\tilde{z}$ and the frequency embedding $\tilde{f}$ as:

$$\tilde{Z} = CSLAB(\delta x, q, k, v),$$

$$\tilde{f} = LFEB(\delta x, f),$$

$$\delta x = \{x_q - x^{(i,j)}\}_{i \in \{1,2,\dots,G_h\}, j \in \{1,2,\dots,G_w\}}$$

where $x^{(i,j)} \in x^{LR}$ denotes a LR coordinate in the local grid indexed by (i, j), and $\delta x$ represents a set of local relative coordinates. The set of local relative coordinates can be represented as the LR coordinates 302 within the local grid 301 as shown in FIG. 3. The query latent vector $q \in \mathbb{R}^{1 \times C}$, at a HR coordinate $x_q$ can be computed by bilinear interpolation, while the rest of the local latent embedding $k \in \mathbb{R}^{G_h G_w \times C}$, $v \in \mathbb{R}^{G_h G_w \times C}$, and $f \in \mathbb{R}^{G_h G_w \times C}$ are sampled at the local LR coordinates $x=\{x^{(i,j)}\}_{i \in \{1,2,\dots,G_h\}, j \in \{1,2,\dots,G_w\}}$.

With the local latent embedding $\tilde{z}$ and the local frequency embedding $\tilde{f}$ been estimated by the CSLAB 401 and the LFEB 402, the decoder 403 can perform a decoding function $D_\phi$ to generate a residual image. The decoding function $D_\phi$ is formulated as:

$$I^r(x_q) = D_\phi(\tilde{Z}, \tilde{f}, c),$$

where $I^r(x_q)$ is the predicted RGB value at the queried coordinate $x_q$, and $c=\{HR_{\Delta h}, HR_{\Delta w}\}$ is the cell representing the height and width of a pixel in an HR image, as shown in FIG. 3. The decoding function $D_\phi$ used by the decoder 403 can be a five-layer MLP with Gaussian Error Linear Unit (GELU) activation and can be shared by all images. Other activation functions, such as ReLU, and SiLU, can also be used as the decoding function for the decoder 403.

Figure 5:
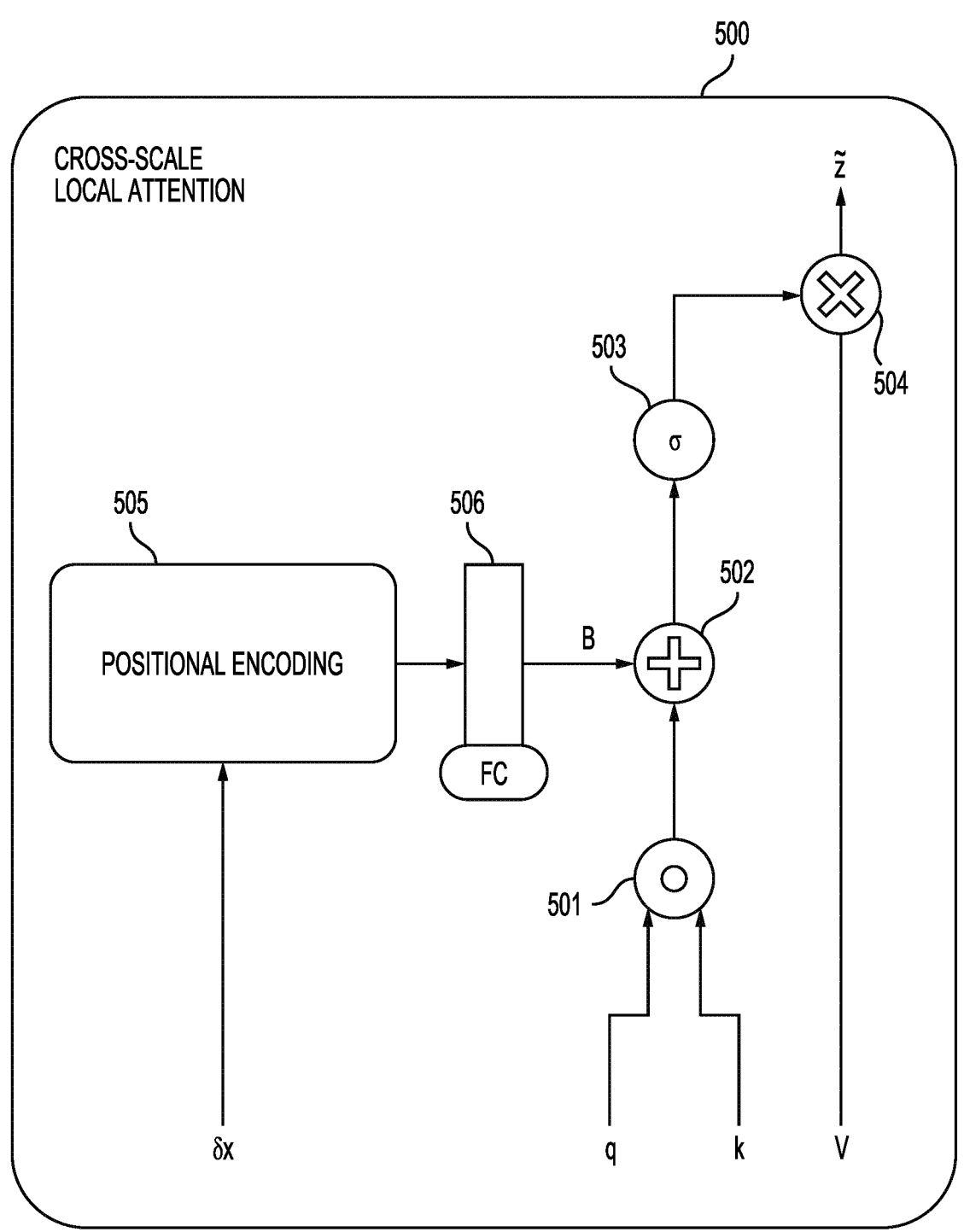
FIG. 5 shows a cross-scale local attention block (CSLAB) 500 according to embodiments of the disclosure.

FIG. 5 shows a cross-scale local attention block (CSLAB) 500 according to embodiments of the disclosure. The LIT exploits the CSLAB 500 to perform a local attention mechanism over a local grid to generate a local latent embedding $\tilde{z}$ for each HR coordinate. The CSLAB 500 can first calculate an inner product 501 of the query q and the key k, and adds the result with the relative positional bias B to derive an attention matrix via element-wise addition 502. The relative positional bias B can be produced by feeding a set of local relative coordinates $\delta x$ into a positional encoding block 505 and then a fully-connected layer 506. The attention matrix can then be normalized by a softmax operation $\sigma$ 503 to generate a local attention map. Finally, the CSLAB 500 can perform element-wise multiplication 504 of the value v and the local attention map to derive $\tilde{z}$. The overall procedure can be formulated as follows:

$$\tilde{Z} = \text{softmax}\left(\frac{qk^T}{\sqrt{C}} + B\right) \times v,$$

$$B = FC(\gamma(\delta x)),$$

$$\gamma(\delta x) = \left[\sin(2^0 \delta x), \cos(2^0 \delta x), \dots, \sin(2^{L-1} \delta x), \cos(2^{L-1} \delta x)\right],$$

where C is the channel dimension of the local key latent embedding k, FC is a fully-connected layer which connects every input neuron to every output neuron, $\gamma$ is the positional encoding function, and L is a hyperparameter. The softmax operation can convert a vector of N real numbers into a probability distribution of N possible outcomes, where the probabilities of each value are proportional to the relative scale of each value in the vector. The hyperparameter L can be pre-set to L=10 and can adopt a multi-head attention mechanism such as:

$$\tilde{Z} = \text{concat}\left(\text{softmax}\left(\frac{q_i k_i^T}{\sqrt{C/H}} + B_i\right) \times v_i\right),$$

where H is the number of attention heads and $i \in [1, \dots, H]$. Other hyperparameters and attention mechanisms can also be used in the CSLAB 500 for computing the local latent embedding $\tilde{z}$.

Figure 6:
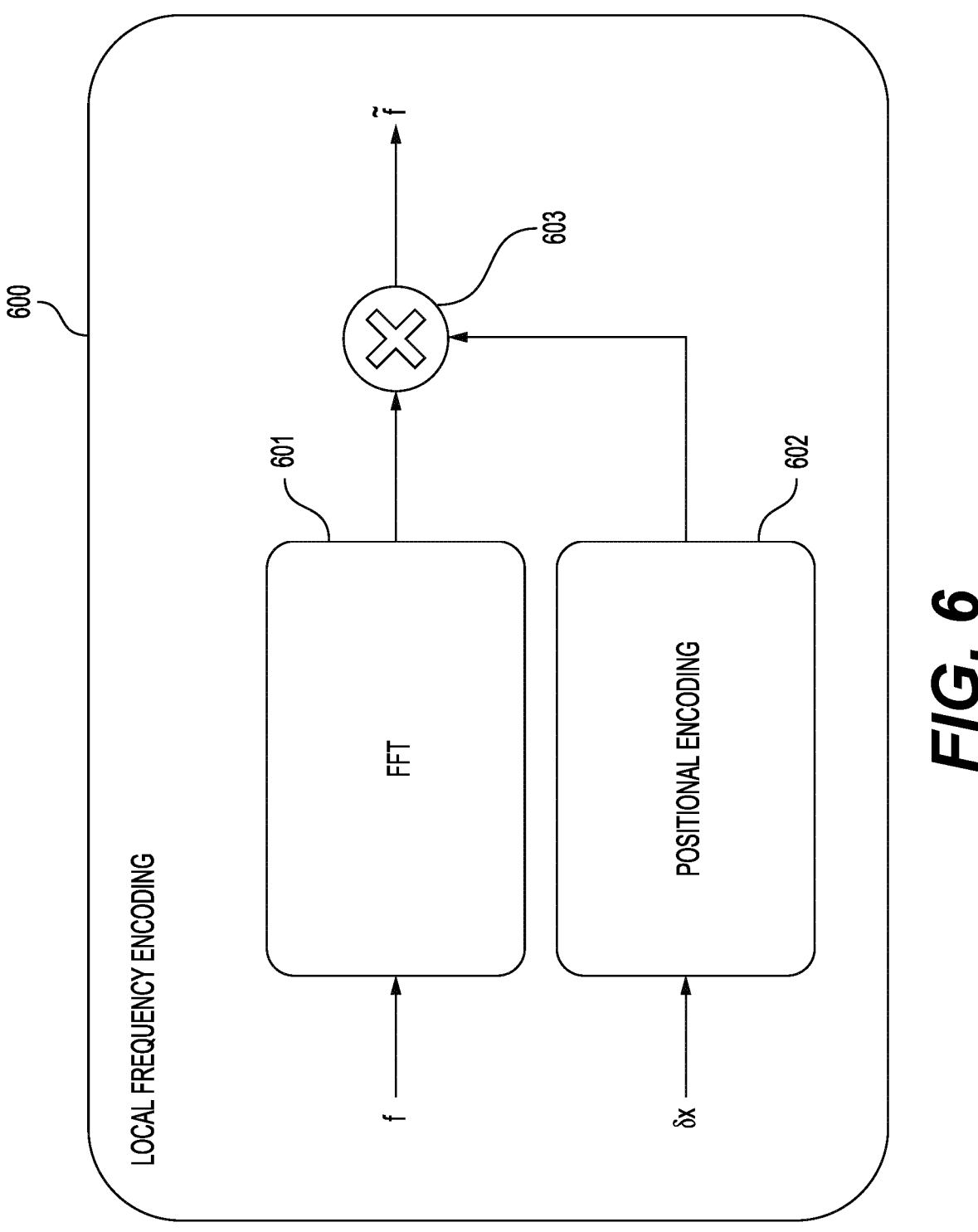
FIG. 6 shows a local frequency encoding block (LFEB) 600 according to embodiments of the disclosure.

FIG. 6 shows a local frequency encoding block (LFEB) 600 according to embodiments of the disclosure. The LFEB 600 can take high frequency components in a queried LR coordinate into consideration to generate the local frequency embedding $\tilde{f}$. The LFEB 600 can first encode the local frequency latent embedding f by performing a Fast Fourier Transform (FFT) 601. The LFEB 600 can also perform positional encoding 602 on a set of relative coordinates. The set of local relative coordinates can be represented as the LR coordinates 302 within the local grid 301 as shown in FIG. 3. The LFEB 600 can then perform an element-wise multiplication 603 to the encoded local frequency latent embedding and the relative positional encoding to generate the local frequency embedding $\tilde{f}$.

The present disclosure proposes a cumulative training strategy for enhancing the performance of arbitrary-scale SR. The cumulative training strategy focuses on the schedule of the cell sizes selected during the training phase, as cell decoding has been recognized as an essential input to a local implicit image function (LIIF) such as the one discussed above. Recent studies have observed that the effect of cell decoding on the performance of arbitrary-scale SR is prominent for in-distribution upsampling but degrades significantly for out-of-distribution large-scale up-sampling. To overcome the degradation issue for out-of-distribution cell sizes, incorporating large upsampling factors during training can be a promising solution but also suffers a performance drop when the LIIF is simply trained with a diverse range of upsampling factors at once. Therefore, the cumulative training strategy first trains the LIIF with small upsampling factors and then finetunes it with the alternative training strategy which trains the LIIF by alternatively switching between small upsampling factors upsampling factors (e.g., 1×~4×) (a first set of upsampling factors) and large upsampling factors upsampling factors (e.g., 5×~30×+) (a second set of upsampling factors).

Figure 7:
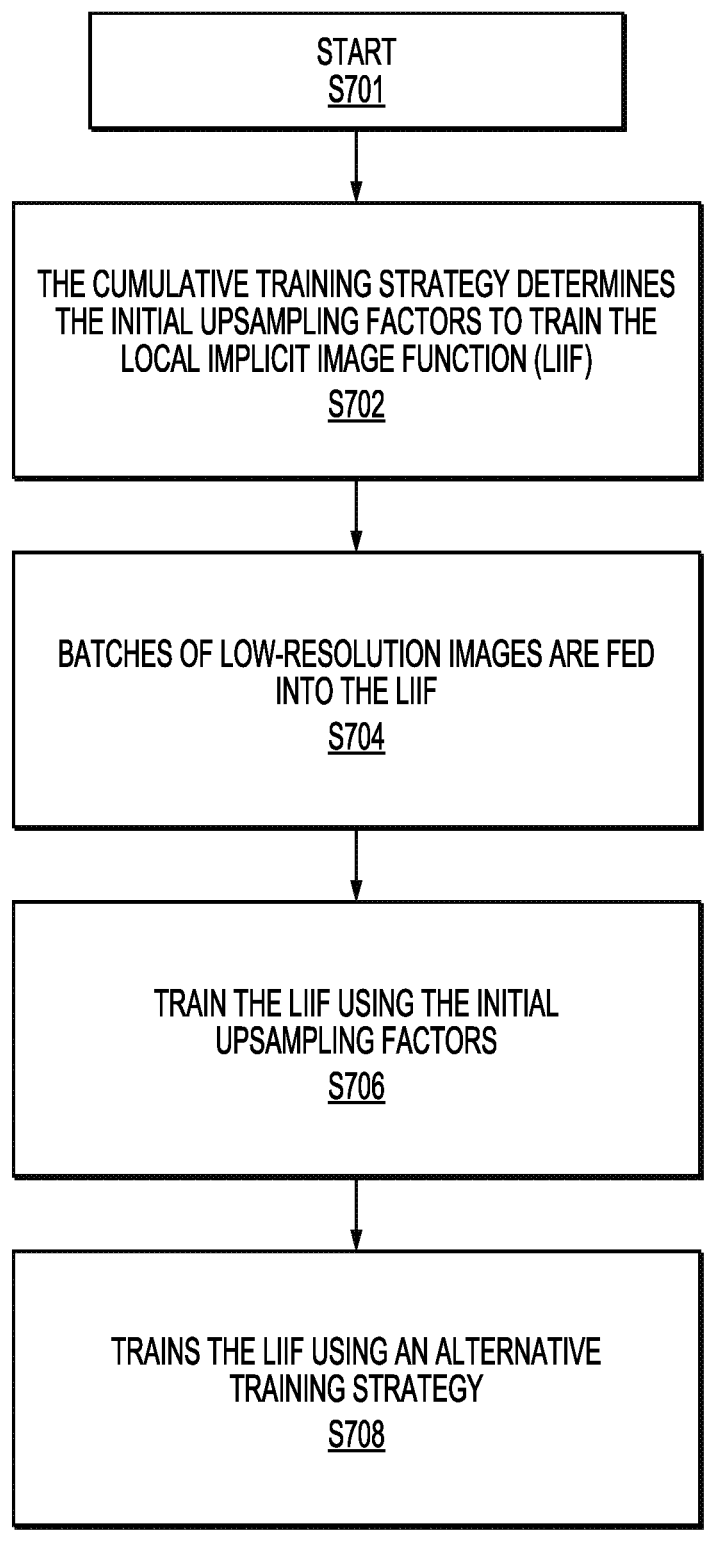
FIG. 7 shows a process 700 of a cumulative training strategy of embodiments of the present disclosure.

FIG. 7 shows a process 700 of a cumulative training strategy of embodiments of the present disclosure. The process 700 can start from S701 and proceed to S702.

At S702, the cumulative training strategy determines the initial upsampling factors to train the local implicit image function (LIIF). For example, the cumulative training strategy can determine that the initial upsampling factors s= $\mathcal{U}(1,4)$, where $\mathcal{U}$ is the uniform distribution function to represent the upsampling factors as 1×~4×.

At S704, batches of low-resolution images are fed into the LIIF.

At S706, the cumulative training strategy trains the LIIF using the initial upsampling factors. The LIIF generates high-resolution images from the input low-resolution images.

At S708, the cumulative training strategy trains the LIIF using an alternative training strategy. For example, the LIIF uses upsampling factors s= $\mathcal{U}(1,12)$ to generate high-resolution images from the input low-resolution images.

Figure 8:
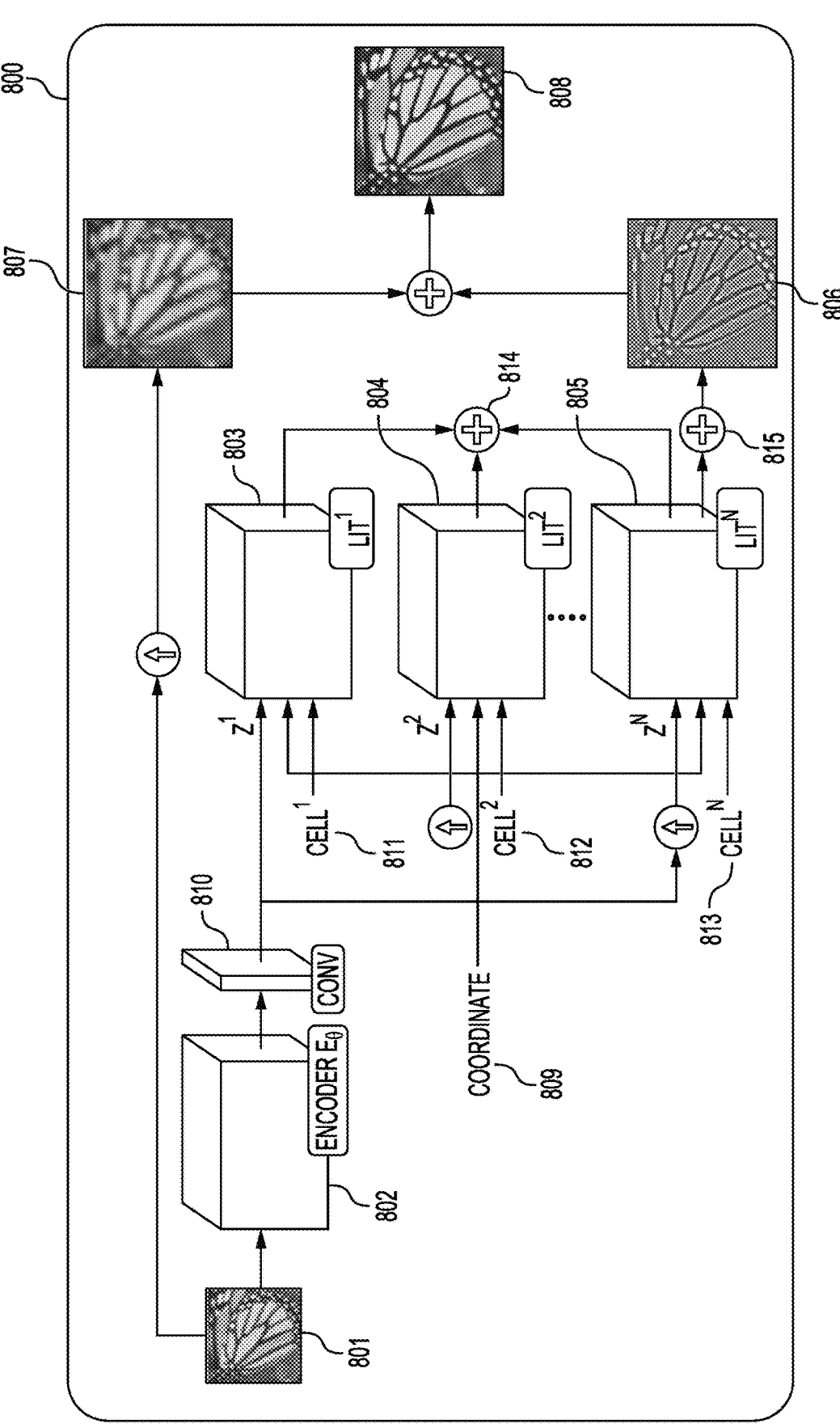
FIG. 8 shows a cascade local implicit transformer (CLIT) 800 with N branches of LITs according to embodiments of the present disclosure.

Reconstructing an HR image from a LR image with one-step large upsampling factors could result in performance drop. FIG. 8 shows a cascade local implicit transformer (CLIT) 800 with N branches of LITs according to embodiments of the present disclosure. The CLIT 800 uses a cascaded upsampling strategy to predict a residual image 806 from multi-scale feature embeddings. The CLIT 800 can receive a LR image 801 and extracts a feature embedding, denoted by $Z$, by an encoder 802. The extracted feature embedding can then be forwarded into the LITs 803-805 after a convolutional layer 810. For N branches of LITs, the multi-scale feature embeddings $Z^1$, $Z^2$, ..., $Z^N$ are derived as:

$$Z^N = Z\uparrow_{s^1 \times s^2 \times \dots \times s^{N-1}}, \text{ where } s^1 = 1 \text{ and } s \in S,$$

Where $\uparrow$ is a bilinear upsampling function and S is a set of upsampling factors, which are configurable hypermeters. For a branch i, $i \in [1, \dots, N]$, $LIT^i$ can estimate the residual image $$I_r^i$$

from the feature embedding $Z^i$ with the coordinate and the corresponding cell $cell^i$ 811-813. For example, the first LIT 803 can receive the extracted feature embedding $Z^1 = Z$. The first LIT 803 can also receive a first cell size $cell^1$ 811 and a queried coordinate 809. For another example, the Nth LIT 805 can receive the bilinear upsampled feature embedding $Z^N$. The Nth LIT 805 can also receive a Nth cell size $cell^N$ 813 and the queried coordinate 809. The final HR image 808, denoted as $I^{HR} \in \mathbb{R}^{r_h H \times r_w W \times 3}$, can be estimated as the following:

$$I^{HR} = \lambda^{N-1} I_r^1 + \lambda^{N-2} I_r^2 + \cdots + \lambda^0 I_r^N + I_\uparrow^{HR}$$

where $\lambda$ is a discount factor of the framework where $\lambda \in (0,1)$, $$I_r^1, \ldots, I_r^N$$

are the individual residual images produced from $LIT^1, \ldots$, $LIT^N$ respectively, and $$I_\uparrow^{HR}$$

represents the bilinear upsampled image 807 of the LR image 801. The final residual image 806 can be produced by adding each individual residual image $$I_r^i$$

of $LIT^i$ via element-wise addition 814-815.

Training the CLIT in a step-by-step fashion can enable the CLIT to enhance its performance progressively. For example, the $LIT^1$ can be first trained with small upsampling factors then finetuned with alternatively training strategy. The $LIT^2$ can be trained with small upsampling factors while $LIT^1$ is being trained with the alternatively training strategy. The following LITs can be added into the training in the similar manner.

The CLIT according to embodiments of the present disclosure has been evaluated with network training datasets such as DIV2K, Set5, Set14, B100, and Urban100. The performance on the validation set of these datasets are evaluated in terms of peak signal-to-noise (PSNR) values. Each dataset includes numerous images in 2K resolutions and provides low-resolution counterparts with down-sampling scales which are generated by the bicubic interpolation method. During training, batches of size 48×48 low-resolution images are fed into the framework. For each batch, a single upsampling scale is sampled from a uniform distribution r~ $\mathcal{U}(1,4)$. With single upsampling scales s, a batch of HR images are cropped into patches of size 48 r×48 r while the corresponding LR images are cropped into patches of 48×48. The patches are augmented by randomly horizontal flipping, vertical flipping, and 90° rotating. $48^2$ pixels (coordinate-RGB pairs) on each HR patch are sampled as the ground-truths. The batch size is set to 32 and uses Adam optimizer together with L1 loss for the network training. The LIT is being trained for 1000 epochs and the learning rate is initialized as $1e^{-4}$ and decayed by factor of 0.5 at [200, 400, 600, 800] epochs. In cumulative training CLIT, N scale factors $\{s^1, s^2, \ldots, s^N\}$ from the distribution $\mathcal{U}(1,4)$ according to the number of LITs N are sampled in the train step. The total upsampling scale $r = s^1 \times s^2 \times \ldots \times s^N$ is the product of all scale factors. If the HR patch size is greater than the whole HR images, the scale factor is clipped to stage 1. For N LITs in the CLIT, the model is finetuned for 500×N epochs and the learning rate is initialized as $1e^{-4}$ and decayed by factor of 0.5 at [100×N, 200×N, 300×N, 400×N] epoch. For transformer-based encoder models, the training schedule can be deduced by analogy.

FIG. 9 shows a performance comparison table between the CLIT according to embodiments of the present disclosure and other models for the DIV2K validation set. The performance comparisons are performed with upsampling factors {2×, 3×, 4×, 6×, 12×, 18×, 24×, 30×}. The present CLIT has outperformed other CNN-based encoder models in upsampling factors {2×, 3×, 4×, 6×, 12×, 18×, 24×, 30×}. The present CLIT has outperformed other transformer-based encoder models in upsampling factors {2×, 3×, 4×, 6×, 12×, 18×}, and has the second-best performance in upsampling factors {24×, 30×}.

FIG. 10 shows a performance comparison table between the CLIT according to embodiments of the present disclosure and other models for the Set5, Set14, B100, and Urban100 validation sets. The performance comparisons are performed with upsampling factors {2×, 3×, 4×, 6×, 8×}. The present CLIT has outperformed other RDN-based encoder models and other transformer-based encoder models in all upsampling factors for every validation set.

Figure 11:
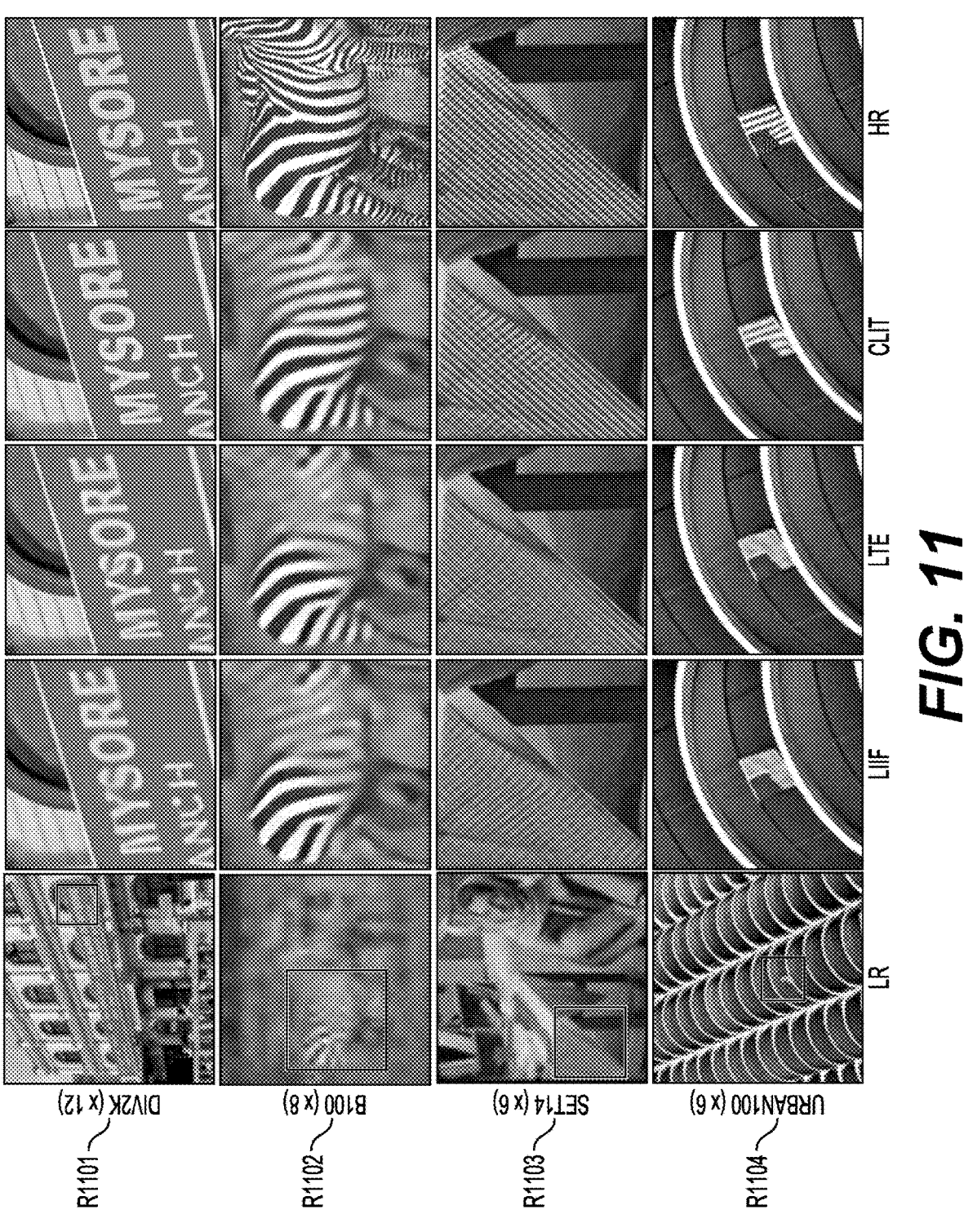
FIG. 11 shows a qualitative result comparison between the CLIT according to the embodiments of the present disclosure and the baselines, the LIIF and the LTE, on various dataset with variant upsampling factors.

FIG. 11 shows a qualitative result comparison between the CLIT according to the embodiments of the present disclosure and the baselines, the LIIF and the LTE, on the various dataset DIV2k, Set14, B100, and Urban100 with variant upsampling factors. The first row R1101 shows the comparison for dataset DIV2k with 12× upsampling factor. It can be observed that LIIF and LTE fail to reconstruct the letter in a continuous way while the CLIT shows continuity for the alphabets, especially for the letter 'M' and 'S'. The second row R1102 shows the comparison for dataset B100 with 8×upsampling factor. The CLIT has a better result compares to the results of the LIIF and the LTE, in the term blurriness of the zebra's stripes on the right side of the image. The third row R1103 shows the comparison for dataset B100 with 6× upsampling factor. It can be observed that the LIIF and the LTE cannot produce the cross pattern on the tablecloth clearly while the CLIT successfully generates clean crosses and sharp lines. The fourth row R1104 shows the comparison for dataset Urban100 with 6× upsampling factor. CLIT catches the texture in the image and generate the straight lines on the flag while LIIF and LTE generated the area with blurring pixels.

Figure 12:
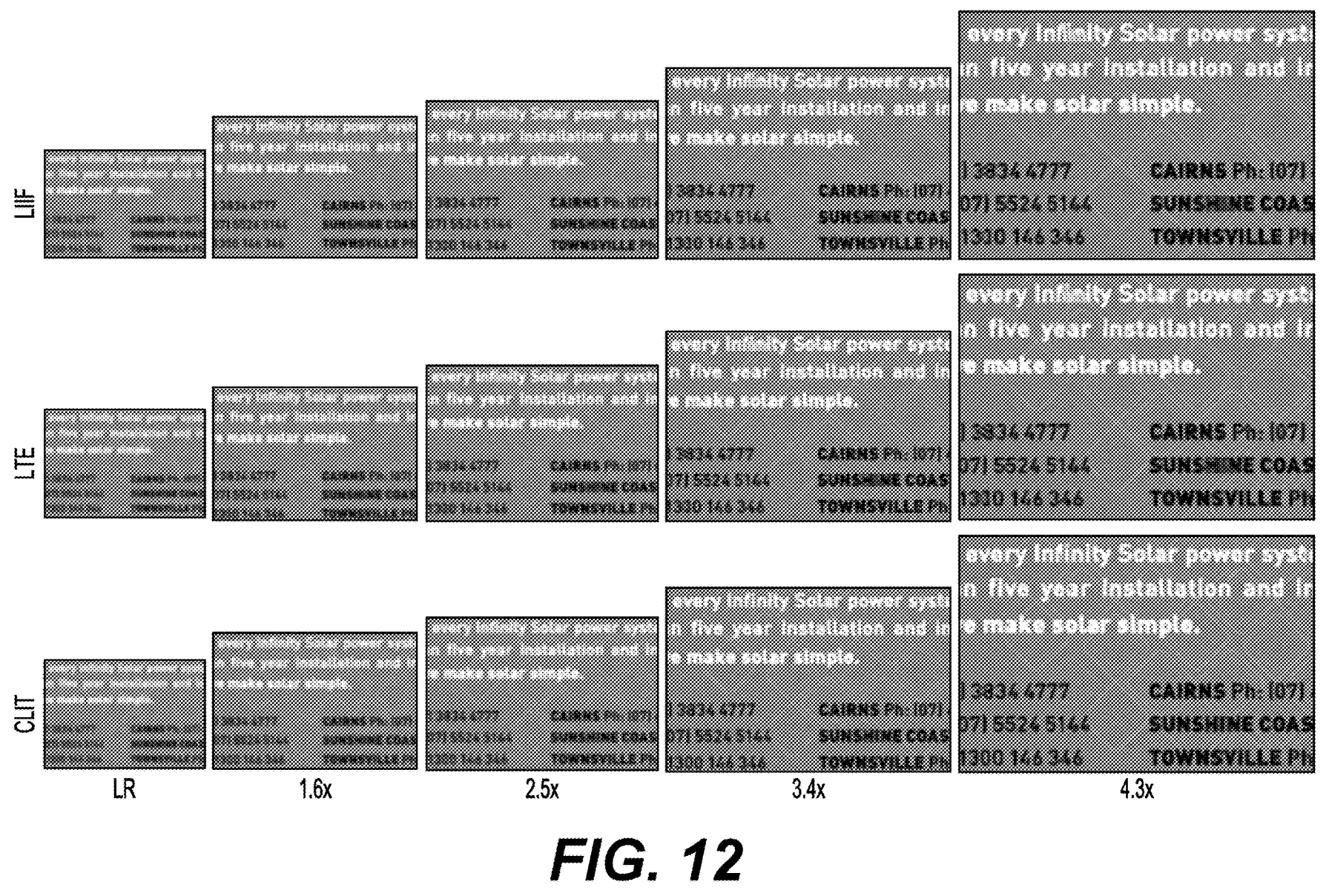

FIG. 12 shows results of text images with non-integer upsampling factors and comparison between the CLIT according to the embodiments of the present disclosure and results from the LIIF and the LTE. The non-integer upsampling factors are predefined to be {1.6×, 2.5×, 3.4×, 4.3×}. It can be observed that the CLIT produces a better result compares to the results of the LIIF and the LTE.

Figure 13:
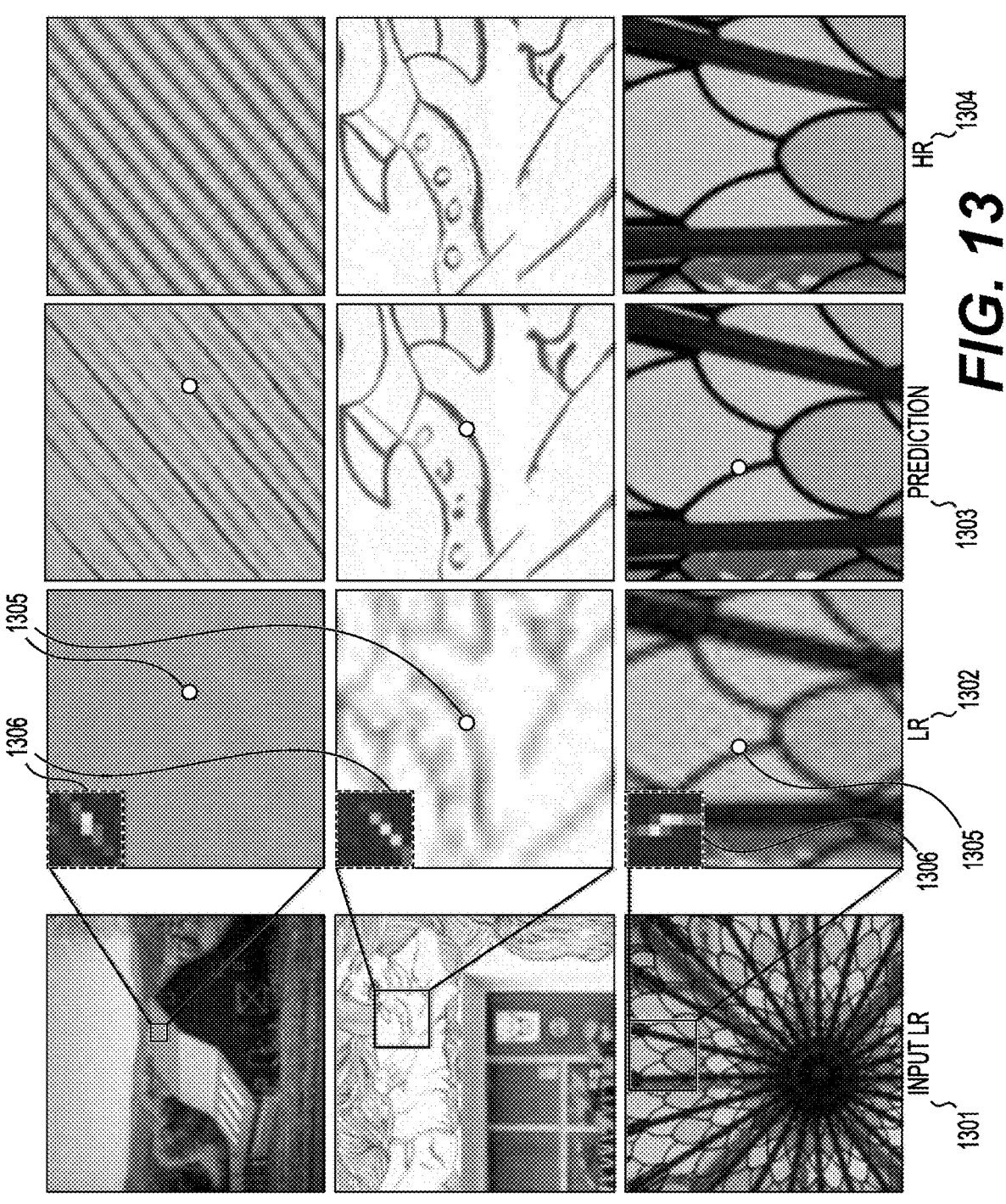
FIG. 13 shows a visualization of local attention maps with the CLIT according to the embodiments of the present disclosure.

FIG. 13 shows a visualization of local attention maps with the CLIT according to the embodiments of the present disclosure. The input LR images 1301 are generated by bicubic down sampling the HR images 1304 with scale factor {×4.5, ×6, ×6}. The CLIT is used with RDN-based model to produce the HR predictions 1303. The points 1305 in the enlarged LR images 1302 are the queried coordinates.

The attention maps 1306 can be observed to closely align with the edges where the points 1305 reside in the enlarged LR images 1302.

The proposed LIT framework is evaluated with clipped cell $\hat{c}=\max(c, c^{tr})$, where $c^{tr}$ denotes the minimum cell size during training. The evaluation is performed on DIV2K validation set using EDSR-baseline and evaluated in terms of peak signal-to-noise (PSNR) values.

FIG. 14 shows a table summarizing the quantitative contributions of each LIT component. The label –a refers to removing cross-scale local attention block. The label –f refers to removing frequency encoding block. The label –c refers to removing cell size. The label +e refers to adding local ensemble. It can be observed that a significant improvement in adopting the cross-scale local attention block and a relatively minor gain with the frequency encoding block by comparing LTE with LTE (–a) and LTE (–f), respectively. In addition, LTE (–c) demonstrates that removing the cell decoding suffers from more severe performance degradation for in-distribution upsampling scales than out-of-distribution counterparts. Such observation indicates the importance of cell decoding to the in-distribution upsampling scales. The local ensemble LIT (+e) further shows a slight performance gain.

FIG. 15 shows a comparison table on the performance by the varying local grid sizes of local coordinate sampling. It can be observed that increasing the local grid size improves qualitatively of the framework until the improvement saturates after the local grid size is greater than 7×7. The performance still increases with local grid size of 15×15 and 25×25, however, the training time required also increased significantly. Therefore, the 7×7 gird size can be adopted as an ideal balance between effectiveness and efficiency.

FIG. 16 shows a quantitative comparison between the proposed cumulative training strategy and existing training strategy. The baseline strategy trains LIT with upsampling scales sampled from a uniform distribution r~ $\mathcal{U}(1,4)$. Directly enlarging the distribution to r~ $\mathcal{U}(1,12)$ improves the performance of large-scale upsampling factors but degrades the some small-scale upsampling factors.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:

receiving a low-resolution (LR) image;

extracting a first feature embedding from the LR image;

performing a first upsampling to the LR image by a first upsampling factor to generate a upsampled image;

receiving a LR coordinate of a pixel within the LR image and a first cell size of the LR coordinate;

generating a first residual image based on the first feature embedding, the LR coordinate, and the first cell size of the LR coordinate using a local implicit image function; and generating a first high-resolution (HR) image by combining the first residual image and the upsampled image;

wherein the first residual image is generated by:

applying convolution functions to the first feature embedding to extract a local frequency latent embedding at the LR coordinate;

performing upsampling operations to the local frequency latent embedding; and generating a local frequency embedding;

wherein the local frequency embedding is generated by:

generating a relative positional encoding of the LR coordinate; and generating the local frequency embedding by multiplying a Fourier transform of the local frequency latent embedding with the relative positional encoding of the LR coordinate.

2. The method of claim 1, wherein the first residual image is generated by:

applying convolution functions to the first feature embedding to extract a local query latent embedding, a local key latent embedding and a local value latent embedding at the LR coordinate;

performing upsampling operations to the local query latent embedding, the local key latent embedding, and the local value latent embedding; and generating a local latent embedding.

3. The method of claim 2, wherein the local latent embedding is generated by:

generating an attention matrix by adding an inner product of the local query latent embedding and the local key latent embedding with a relative positional bias of the LR coordinate;

generating a local attention map by normalizing the attention matrix; and generating the local latent embedding by performing element-wise multiplication of the local value latent embedding and the local attention map.

4. The method of claim 1, further comprising:

training the local implicit image function with a first set of upsampling factors; and training the local implicit image function by alternatively switching between the first set of upsampling factors and a second set of upsampling factors, wherein upsampling factors in the first set of upsampling factors are smaller than upsampling factors in the second set of upsampling factors.

5. The method of claim 1, further comprising:

performing a second upsampling to the first feature embedding by a second upsampling factor to generate a second feature embedding;

generating a second residual image based on the second feature embedding, the LR coordinate, and a second cell size of the LR coordinate using the local implicit image function;

generating a combined residual image by combining the first residual image and the second residual image; and generating a second HR image by combining the combined residual image and the upsampled image.

6. An apparatus, comprising circuitry configured to:

receive a low-resolution (LR) image;

extract a first feature embedding from the LR image;

perform a first upsampling to the LR image by a first upsampling factor to generate a upsampled image;

receive a LR coordinate of a pixel within the LR image and a first cell size of the LR coordinate;

generate a first residual image based on the first feature embedding, the LR coordinate, and the first cell size of the LR coordinate by using a local implicit image function; and generate a first high-resolution (HR) image by combining the first residual image and the upsampled image;

wherein the circuitry is further configured to:

apply convolution functions to the first feature embedding to extract a local frequency latent embedding at the LR coordinate;

perform upsampling operations to the local frequency latent embedding; and generate a local frequency embedding;

wherein the circuitry is further configured to:

generate a relative positional encoding of the LR coordinate; and generate the local frequency embedding by multiplying a Fourier transform of the local frequency latent embedding with the relative positional encoding of the LR coordinate.

7. The apparatus of claim 6, wherein the circuitry is further configured to:

apply convolution functions to the first feature embedding to extract a local query latent embedding, a local key latent embedding, and a local value latent embedding at the LR coordinate;

perform upsampling operations to the local query latent embedding, the local key latent embedding, and the local value latent embedding; and generate a local latent embedding.

8. The apparatus of claim 7, wherein the circuitry is further configured to:

generate an attention matrix by adding an inner product of the local query latent embedding and the local key latent embedding with a relative positional bias of the LR coordinate;

generate a local attention map by normalizing the attention matrix; and generate the local latent embedding by performing element-wise multiplication of the local value latent embedding and the local attention map.

9. The apparatus of claim 6, wherein the circuitry is further configured to:

train the local implicit image function with a first set of upsampling factors; and train the local implicit image function by alternatively switching between the first set of upsampling factors and a second set of upsampling factors, wherein upsampling factors in the first set of upsampling factors are smaller than upsampling factors in the second set of upsampling factors.

10. The apparatus of claim 8, wherein the circuitry is further configured to:

perform a second upsampling to the first feature embedding by a second upsampling factor to receive a second feature embedding;

generate a second residual image based on the second feature embedding, the LR coordinate, and a second cell size of the LR coordinate by using the local implicit image function;

generate a combined residual image by combining the first residual image and the second residual image; and generate a second HR image by combining the combined residual image and the upsampled image.

11. A non-transitory computer-readable medium storing instructions that, when executed by a processor, cause the processor to perform a method, the method comprising:

receiving a low-resolution (LR) image;

extracting a first feature embedding from the LR image;

performing a first upsampling to the LR image by a first upsampling factor to generate a upsampled image;

receiving a LR coordinate of a pixel within the LR image and a first cell size of the LR coordinate;

generating a first residual image based on the first feature embedding, the LR coordinate, and the first cell size of the LR coordinate using a local implicit image function; and generating a first high-resolution (HR) image by combining the first residual image and the upsampled image;

wherein the first residual image is generated by:

applying convolution functions to the first feature embedding to extract a local frequency latent embedding at the LR coordinate;

performing upsampling operations to the local frequency latent embedding; and generating a local frequency embedding;

wherein the local frequency embedding is generated by:

generating a relative positional encoding of the LR coordinate; and generating the local frequency embedding by multiplying a Fourier transform of the local frequency latent embedding with the relative positional encoding of the LR coordinate.

12. The non-transitory computer-readable medium of claim 11, wherein the method further comprises:

applying convolution functions to the first feature embedding to extract a local query latent embedding, a local key latent embedding, and a local value latent embedding at the LR coordinate;

performing upsampling operations to the local query latent embedding, the local key latent embedding, and the local value latent embedding; and generating a local latent embedding.

13. The non-transitory computer-readable medium of claim 12, wherein the method further comprises:

generating an attention matrix by adding an inner product of the local query latent embedding and the local key latent embedding with a relative positional bias of the LR coordinate;

generating a local attention map by normalizing the attention matrix; and generating the local latent embedding by performing element-wise multiplication of the local value latent embedding and the local attention map.

14. The non-transitory computer-readable medium of claim 11, wherein the method further comprises:

training the local implicit image function with a first set of upsampling factors; and training the local implicit image function by alternatively switching between the first set of upsampling factors and a second set of upsampling factors, wherein upsampling factors in the first set of upsampling factors are smaller than upsampling factors in the second set of upsampling factors.

15. The non-transitory computer-readable medium of claim 11, wherein the method further comprises:

performing a second upsampling to the first feature embedding by a second upsampling factor to generate a second feature embedding;

generating a second residual image based on the second feature embedding, the LR coordinate, and a second cell size of the LR coordinate using the local implicit image function;

generating a combined residual image by combining the first residual image and the second residual image; and generating a second HR image by combining the combined residual image and the upsampled image.

\* \* \* \* \*